(12) United States Patent
Cramer (10) Patent No.: US 10,053,257 B2
(45) Date of Patent: Aug. 21, 2018

(54) DEVICE AND METHOD FOR UNPACKING AND FEEDING FLAT-FOLDED AND UPRIGHT PACKAGING SLEEVES

(75) Inventor: Thomas Cramer, Syke (DE)

(73) Assignee: SIG Technology Ltd., Neuhausen am Rheinfall (CH)

( * ) Notice: Subject to any disclaimer, the term of this patent is extended or adjusted under 35 U.S.C. 154(b) by 867 days.

(21) Appl. No.: 14/234,507

(22) PCT Filed: Jun. 29, 2012

(86) PCT No.: PCT/EP2012/062659
§ 371 (c)(1),
(2), (4) Date: Jan. 23, 2014

(87) PCT Pub. No.: WO2013/017348
PCT Pub. Date: Feb. 7, 2013

(65) Prior Publication Data
US 2014/0190130 A1     Jul. 10, 2014

(30) Foreign Application Priority Data
Jul. 29, 2011    (DE) .................. 10 2011 108 798

(51) Int. Cl.
*B25J 15/06*         (2006.01)
*B26D 7/01*          (2006.01)
(Continued)

(52) U.S. Cl.
CPC ....... *B65B 69/0033* (2013.01); *B25J 15/0616* (2013.01); *B26D 7/01* (2013.01);
(Continued)

(58) Field of Classification Search
CPC ...... B25J 15/0616; B65B 43/44; B65B 43/46; B65B 69/0033
(Continued)

(56) References Cited

U.S. PATENT DOCUMENTS 3,648,853 A * 3/1972 Winne .................... B23Q 7/04
                                                        294/64.2
4,696,615 A    9/1987 Ettischer et al.
(Continued)

FOREIGN PATENT DOCUMENTS

CN          1490221 A    4/2004
CN          1781811 A    6/2006
(Continued)

*Primary Examiner* — Thanh Truong
*Assistant Examiner* — Patrick Fry
(74) *Attorney, Agent, or Firm* — The Webb Law Firm (57) ABSTRACT

A device for transferring flat-folded and upright packaging sleeves to a further processing unit, in particular a filling machine for liquid or pasty products, wherein in each case a certain number of packaging sleeves are provided in an outer package and wherein the outer packages of the packaging sleeves are opened and removed. At least one gripper element may be disposed on a robot arm for transporting an outer package to a cutting and unpacking station, elements for cutting open and unpacking the packaging sleeves, at least one suction device for vacuuming away the cutting dust resulting from the cutting open and a gripping device for gripping the packaging sleeves released from the outer package and delivering these to the further processing unit are provided.

19 Claims, 10 Drawing Sheets

(51) Int. Cl.
*B26D 7/06* (2006.01)
*B65B 3/00* (2006.01)
*B65B 43/44* (2006.01)
*B65B 43/46* (2006.01)
*B65B 69/00* (2006.01)

(52) U.S. Cl.
CPC .......... *B26D 7/0633* (2013.01); *B65B 43/46* (2013.01); *B26D 7/018* (2013.01); *B65B 3/00* (2013.01); *B65B 43/44* (2013.01)

(58) Field of Classification Search
USPC ........................................................ 414/797
See application file for complete search history.

(56) References Cited

U.S. PATENT DOCUMENTS

| | | | | |
|---|---|---|---|---|
| 4,894,597 | A * | 1/1990 | Ohtomi | B24B 9/00 318/568.22 |
| 5,371,938 | A * | 12/1994 | Martin | B65B 69/0033 29/564.3 |
| 5,558,923 | A * | 9/1996 | Vesamaa | B31D 5/006 428/137 |
| 5,970,834 | A | 10/1999 | Garofano et al. | |
| 5,984,623 | A | 11/1999 | Smith et al. | |
| 6,189,298 | B1 | 2/2001 | Kuji et al. | |
| 7,803,100 | B2 * | 9/2010 | Lu | B31D 5/0047 493/344 |
| 8,162,362 | B2 * | 4/2012 | Braunschweiger | B65G 61/00 294/188 |
| 2004/0099507 | A1 | 5/2004 | Spatafora | |
| 2006/0102768 | A1 | 5/2006 | Benz et al. | |
| 2010/0032972 | A1 * | 2/2010 | Braunschweiger | B65G 61/00 294/185 |
| 2010/0185315 | A1 | 7/2010 | Schmidt et al. | |
| 2011/0100175 | A1 | 5/2011 | Freudenberg et al. | |

FOREIGN PATENT DOCUMENTS

| | | |
|---|---|---|
| CN | 101801617 A | 8/2010 |
| DE | 69000287 T2 | 1/1993 |
| DE | 69314149 T2 | 1/1998 |
| DE | 19825599 A1 | 12/1999 |
| DE | 19959285 A1 | 6/2001 |
| DE | 10355544 A1 | 6/2005 |
| DE | 102004043102 A1 | 3/2006 |
| DE | 102007041423 A1 | 3/2009 |
| EP | 0059982 A1 | 9/1982 |
| EP | 0404272 A1 | 12/1990 |
| EP | 0411523 A1 | 2/1991 |
| EP | 1415920 A1 | 5/2004 |
| GB | 1017535 | 1/1966 |
| SU | 1381034 A1 | 3/1988 |

* cited by examiner

DEVICE AND METHOD FOR UNPACKING AND FEEDING FLAT-FOLDED AND UPRIGHT PACKAGING SLEEVES

CROSS-REFERENCE TO RELATED APPLICATIONS

This application is the United States national phase of International Application No. PCT/EP2012/062659 filed Jun. 29, 2012, and claims priority to German Patent Application No. 10 2011 108 798.6 filed Jul. 29, 2011, the disclosures of which are hereby incorporated in their entirety by reference.

BACKGROUND OF THE INVENTION

Field of the Invention

The invention relates to a device and a method for transferring flat-folded and upright packaging sleeves to a further processing unit, in particular a filling machine for liquid or pasty foodstuffs, wherein in each case a certain number of packaging sleeves are provided in an outer package and wherein the outer packages of the packaging sleeves are opened and removed.

Description of Related Art

A method and a device for transferring blanks from outer packages to a further processing unit is known from DE 103 55 544 A1 attributable to the applicant. In order to avoid damage to the blanks contained in the outer packages these are compressed in order to create a necessary cavity for the cutting blade to pass through. For this it is necessary that the outer packages are fed to the device individually on a linear feed device.

On this basis, the object of the invention is to automate as far as possible the loading of a filling machine with packaging sleeves which to date has been performed manually. To this end a reliably operating device is to be created in order to be able to perform both the feeding of packaging sleeves and the removal and disposal of the outer packages, automatically.

SUMMARY OF THE INVENTION

This object is solved by at least one gripper element disposed on a robot arm for transporting an outer package to a cutting and unpacking station, elements for cutting open and unpacking the packaging sleeves, at least one suction device for vacuuming away the cutting dust resulting from the cutting open and a gripping device for gripping the packaging sleeves released from the outer package and transferring these to the further processing unit.

A preferred configuration of the invention provides that the gripper element has a plurality of pneumatically operated vacuum suction elements. Preferably three vacuum suction elements are provided here disposed in a triangle in the same plane, wherein the size of the triangle is selected so that all three vacuum suction elements are able to rest against one side of the outer package.

In a preferred configuration of the invention the gripper element has in a further plane arms that can swivel with vacuum suction elements on them, in order to be able to further secure the outer package, so that more rapid linear and/or rotatory movements of the gripper element are also possible. Furthermore, this also allows the outer package to be reliably rotated from a first to a second plane, wherein vacuum suction elements always engage with the—respective—upper surface.

In a further configuration of the invention the robot arm or the gripper element has at least one optical sensor for detecting the position and alignment of the outer packages. This optical sensor preferably comprises a laser, a detector for detecting the reflected laser beam and at least one mirror that can swivel for 3D object and positional determination. In this way it is possible to clearly identify the alignment of the outer packages delivered nested on pallets. The outer packages can usefully be provided with corresponding markings in order to make detection of their position easier.

A further teaching of the invention provides that the cutting and unpacking station has a blade unit for cutting open the outer packages. In order that the outer packages can also be reliably removed from the packaging sleeves, the cutting and unpacking station also preferably has an opening and turning device, in order to position the outer package with the cut and open side downwards, thereby simplifying removal of the packaging sleeves.

More preferably the cutting and unpacking station has a lifting plate for depositing the packaging sleeves released from the outer package, wherein the lifting plate can be moved vertically, in order on the one hand to make the pulling away of the outer packages easier and on the other to be able to bring the packaging sleeves into the plane of the transfer device.

In a further embodiment of the invention the device has means for folding flat and disposing of the outer packages that have been removed. Such a configuration is appropriate for fully automated operation, in order to guarantee not only the continuous feeding of packed packaging sleeves but also the disposal of the empty outer packages that are no longer needed.

In order to connect the gripping device reliably with the gripper element, not only is there a mounting via the vacuum suction elements but also a positive coupling of both parts.

In order that the device according to the invention is able to work reliably with continued operation of the filling machine, when it is necessary to swap the pallet for one with new outer packages, according to a further teaching according to the invention it has at least one magazine to accommodate a plurality of unopened outer packages, so that during a pallet change the necessary outer packages can be taken from this magazine.

In a corresponding method the object is solved by the following steps:
a) receiving an unopened outer package;
b) aligning and transporting the outer package to a cutting and unpacking station;
c) feeding of the top side of the outer package to a blade unit;
d) cutting open the outer package and folding back the opened top sides;
e) vacuuming away the resulting cutting dust;
f) clamping and positioning the packaging sleeves contained in the opened outer package on a lifting plate;
g) removing the outer package and clamping of the packaging sleeves by their two free end faces;
h) removing the outer packaging;
i) raising the lifting plate in a gripping device located above it to the level of the feed plane of the further processing unit; and
j) delivering the packaging sleeves by means of the gripping device to the desired feed line of the further processing device.

As already stated in the description of the device, the outer packages are preferably delivered on a pallet. In order that the pallets do not have to be delivered each time precisely in a particular position, in a further configuration of the invention, prior to step a) the detection of the position and alignment of the unopened packages takes place, so that the gripper element can pick the outer packages individually from the pallet one after another. Preferably between steps a) and b) intermediate storage of unopened packages also takes place in a magazine in order to guarantee continuous operation.

A further teaching of the invention provides that the outer packages are initially gripped by a gripper element on their free longitudinal side and additionally by vacuum suction elements on their top side, in order to reliably guarantee a secure grip. During transfer to the cutting and unpacking station the outer packages are rotated by the gripper element in such a way that the top side of the packaging sleeve points towards the blade unit.

It is clear that the cutting open can take place in a number of ways, and in fact by movement of the cutting blade, the outer package or even the superimposed movement of both. What is important is a relative movement of the cutting blade and the outer package. Preferably the gripper element moves the outer package towards the stationary blade.

A further configuration of the invention provides that the cutting open of the package and the vacuuming away of the resulting cutting dust can also take place simultaneously. Clearly, immediately after the vacuuming away following the cutting process the risk of contamination is significantly reduced.

In a further teaching according to the invention prior to step i) the top side of the packaging sleeve standing upright on the lifting plate is also vacuumed. This guarantees that all opening areas of the still flat-folded packaging sleeves are dust-free.

A further configuration according to the invention provides that the outer packages that have been removed and opened on one side are fed by the gripper element to a box press, in which the still sealed undersides are cut into and folded so that a subsequent pressing device can compress the boxes in a defined manner. To do this, cutting blades disposed in the pressing device punch triangular latches in the compressed side walls, which are then crimped so that the compressed box after being dropped into a waste trolley cannot open again.

BRIEF DESCRIPTION OF THE DRAWINGS

In the following the invention is described further by means of a preferred embodiment. The drawing shows as follows.

DESCRIPTION OF THE INVENTION

Figure 1A:
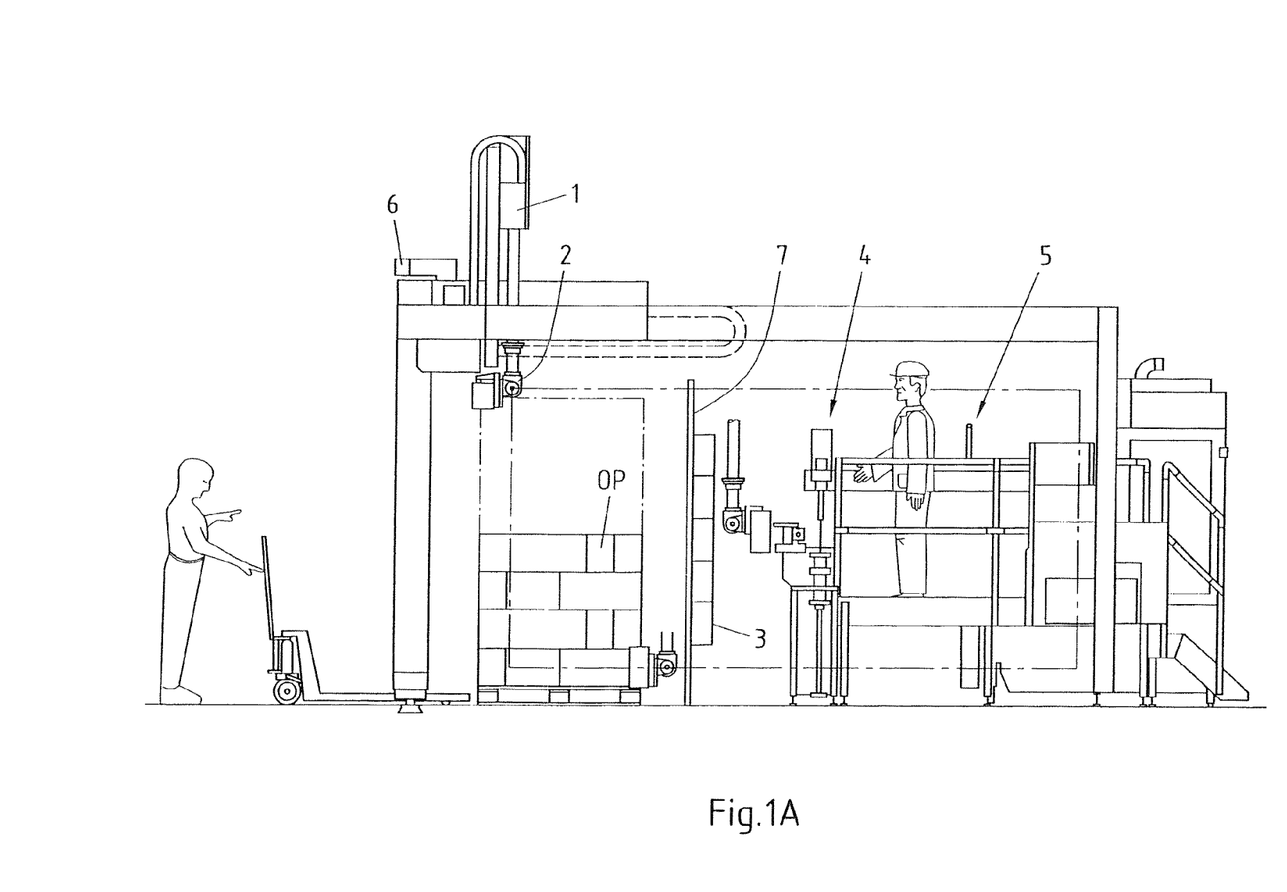
FIG. 1A to 1C a device according to the invention in a three-view drawing.
Figure 1B:
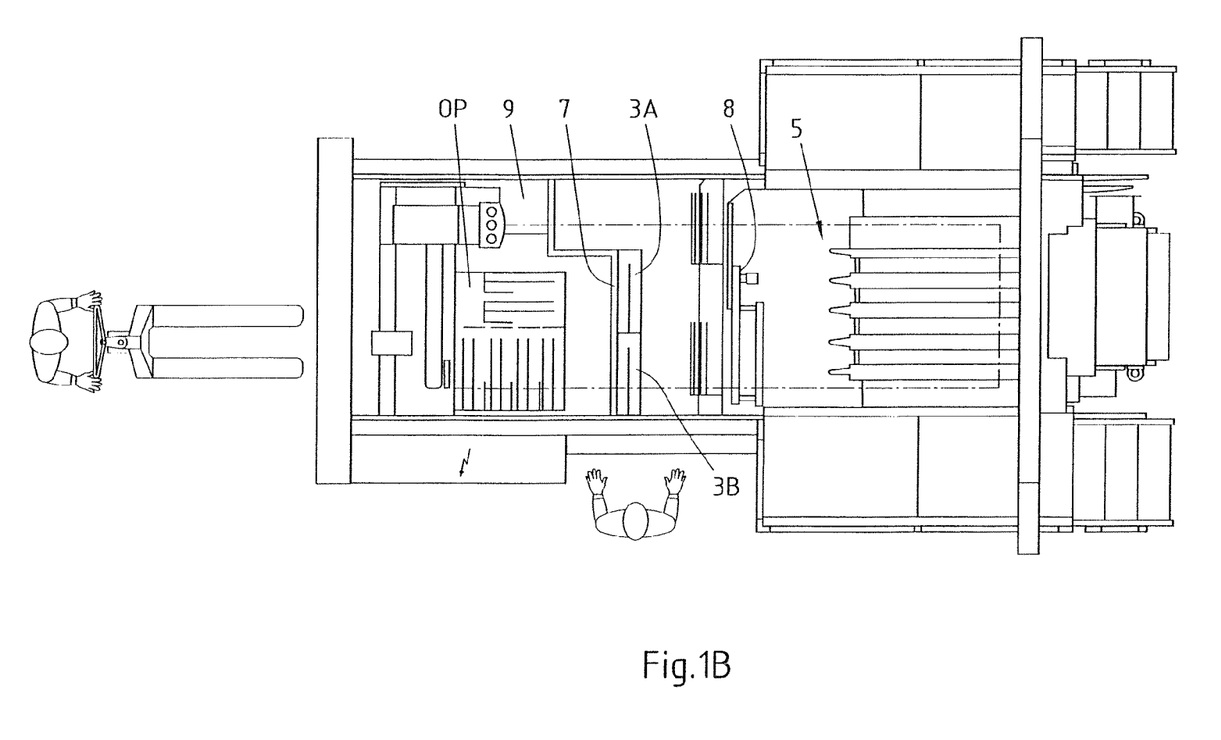
Figure 1C:
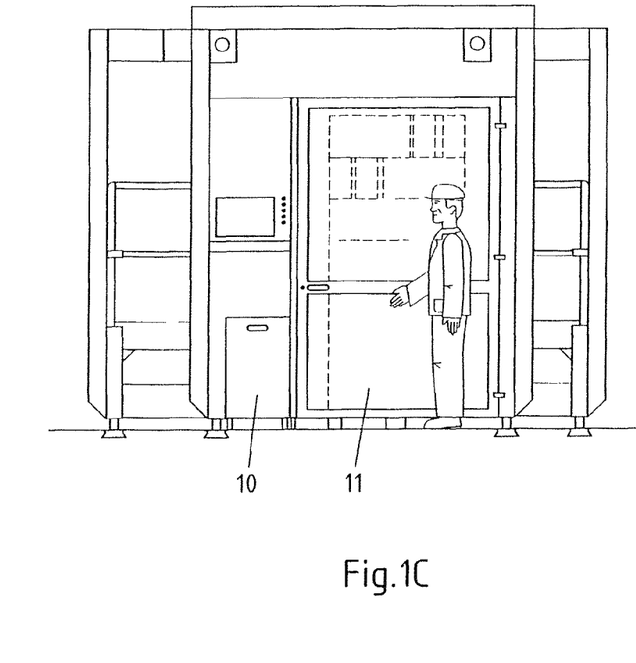

The device shown as a three-view drawing in FIG. 1 essentially comprises the following elements: a robot arm 1, with predominantly numerically controlled movement axes, a gripper element 2 with predominantly pneumatically driven movement axes, in the embodiment shown and which is in this sense preferred a magazine 3 for intermediate storage of outer packages OP, which in the embodiment shown are stacked on a pallet P as the transport unit, a cutting and unpacking station 4 and a transfer plane 5 to a filling machine (not shown) connected to the device. A laser scanner 6 identifies the position and alignment of the outer packages OP and the distance of these from the gripper element 1. A lock wall 7 separates the device into a feed side (left) and a work side (right).

In the top view of FIG. 1B it will be noticed that the magazine 3 has two receiving shafts 3A and 3B disposed next to each other. Immediately to the right a blade unit 8 for cutting open the outer packages OP can be identified. Outer package is the term used for a box in which the blanks (packaging sleeves) of the packages to be filled are provided. At the transfer plane 5 four parallel mounting rails that are not specified further can be identified for the subsequent lines of the filling machine, into which the unpacked packaging sleeves must be introduced upright in the direction of the filling machine. The device also has a box press 9 and a waste trolley 10 for the removed and flattened outer packages OP.

Because of the hazard posed during ongoing operation, the device has a danger area boundary that is to say that the device is fully encapsulated from the outside. An access door 11 allows the provision of the pallets P, The provision of the pallets P can take place both by a fork-lift truck and operator (not shown) or by an automated storage and feed system.

It goes without saying that the robot arm 1 when the access door 11 is opened should not operate in the vicinity of the feed side (left of the lock wall 7). Nevertheless, ongoing operation can continue since the gripper element 2 on the working side of the device (to the right of the lock wall 7) can take outer packages OP from the magazine 3 and feed them to the cutting and unpacking station 4.

Figure 2A:
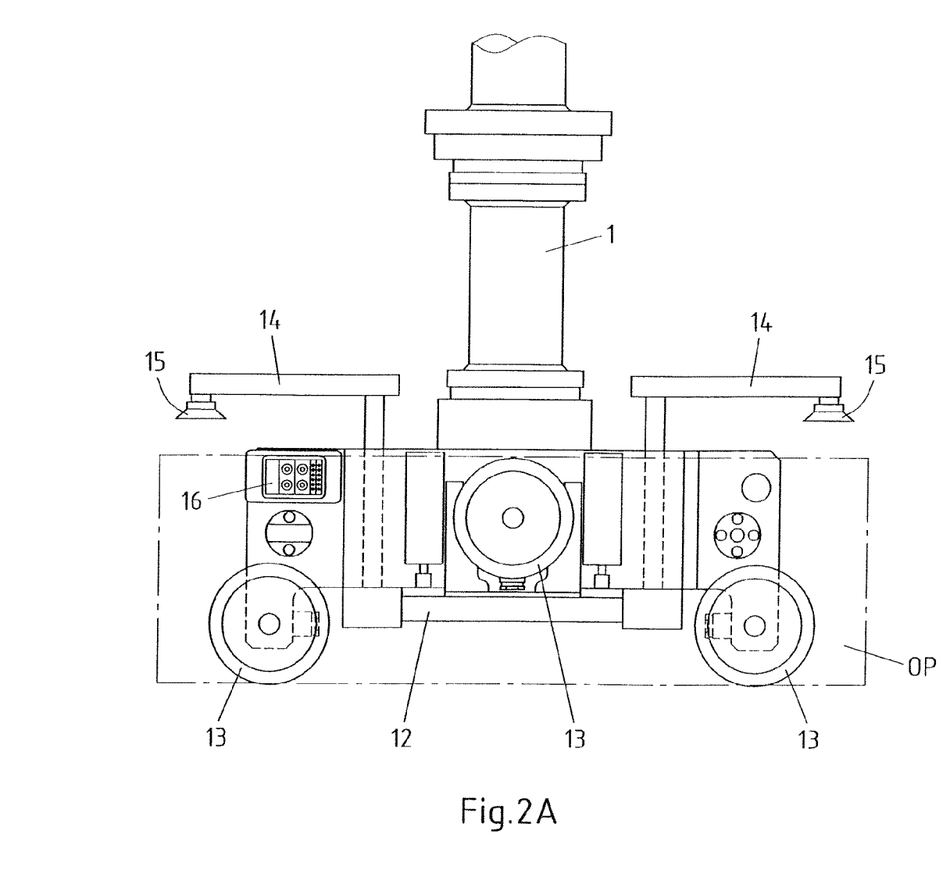
FIG. 2A to 2C the gripper element forming the core of the device according to the invention in a three-view drawing.
Figure 2B:
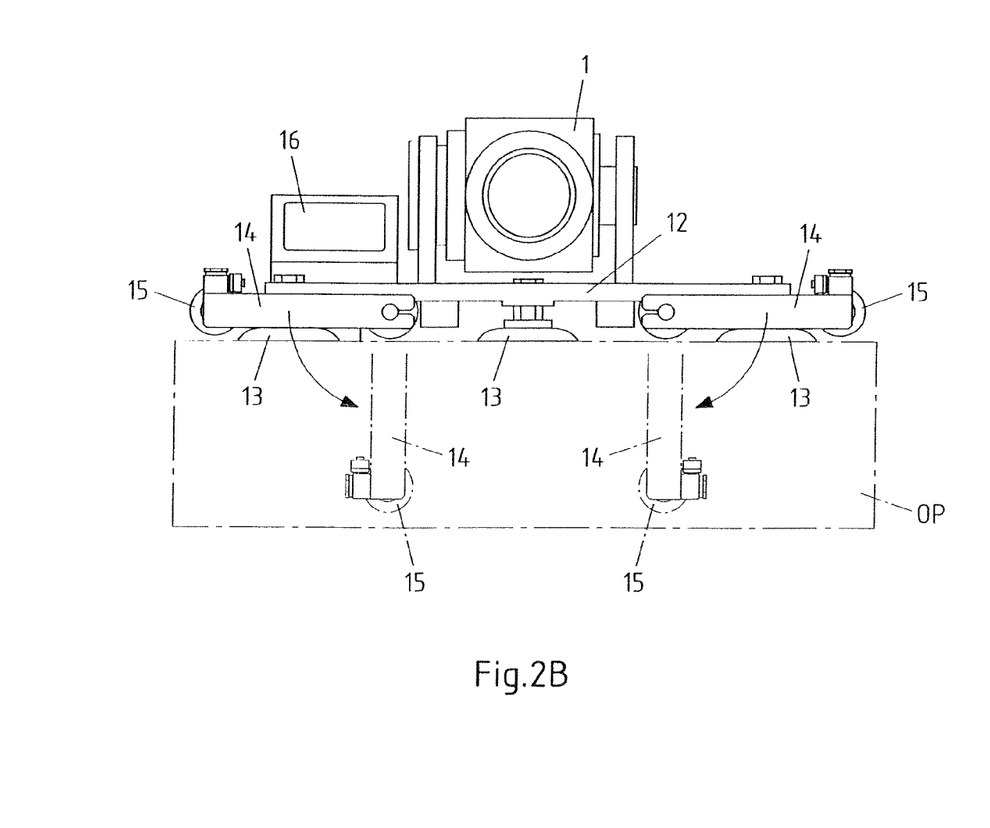
Figure 2C:
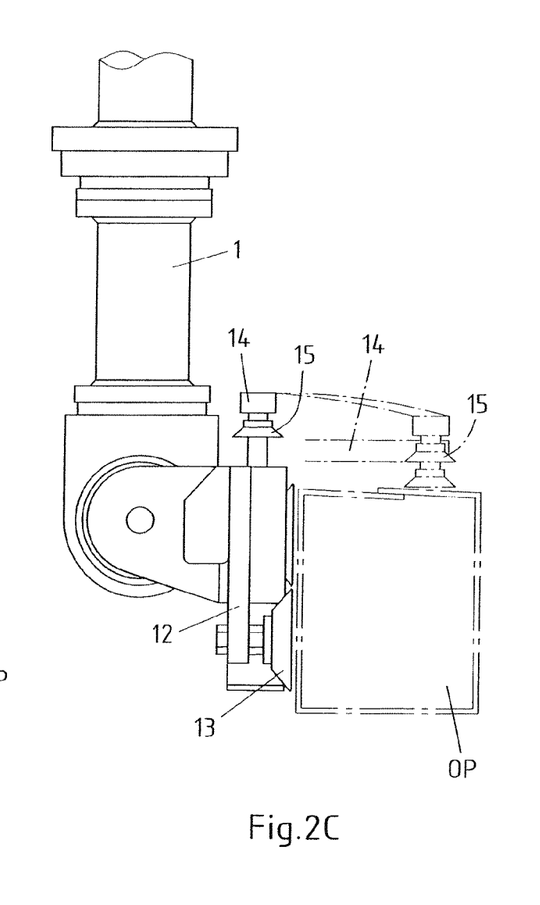

FIG. 2 shows a gripper element 2 in a representation that has been greatly enlarged from FIG. 1. It comprises first and foremost and essentially a yoke 12 disposed on the end of the robot arm 1 so that it can swivel, upon which three vacuum elements 13 are disposed in a triangle, as shown in the side view of FIG. 2A. Two swivel arms 14 can also be identified and on the end of each of these a further vacuum element 15 is disposed. The swivel arms can be swivelled through 90° following the arrow, so that an outer package OP (shown by a dot-dash line), after being picked up by the vacuum suction elements 13 from the side, can also be gripped from the top by means of the swivel arms 14 and the vacuum suction elements 15, as can be seen clearly in particular from the top view in FIG. 2B and the frontal view in FIG. 2C. The pneumatic connections of the vacuum suction elements 13 and 15 are not shown in detail, for the sake of clarity, but an electro-pneumatic coupling 16 necessary for the supply is shown.

Figure 3:
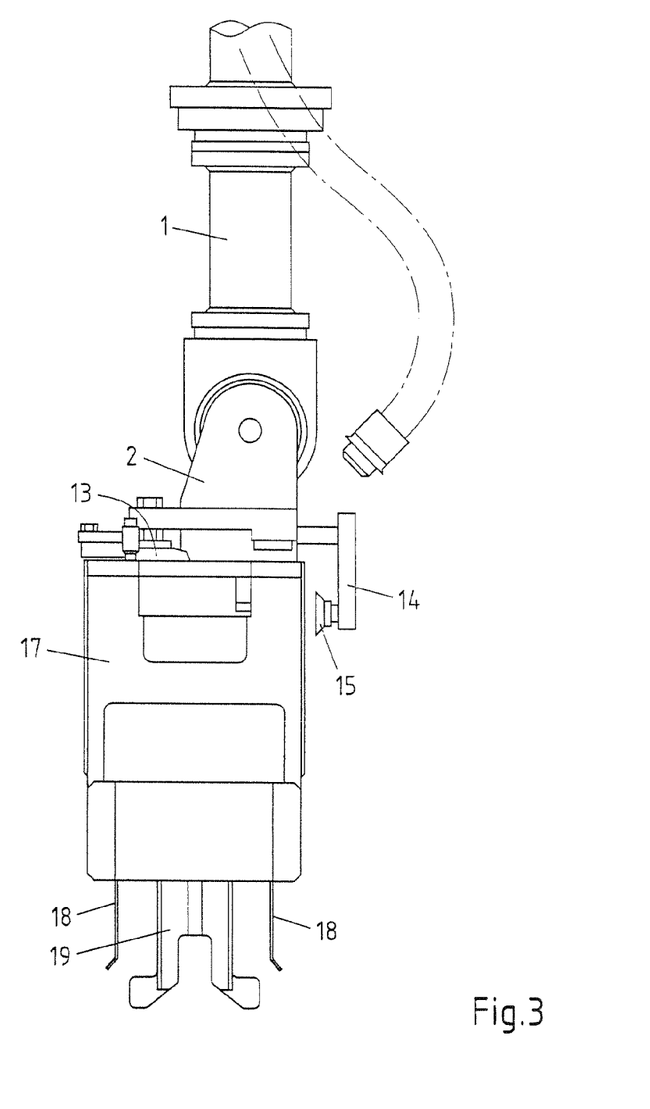
FIG. 3 the gripper element from FIG. 2 with the gripping device secured to it as a side view.

FIG. 3 shows a gripping device 17, which—just like an outer package OP—can be gripped by a gripper element 2 disposed on the end of the robot arm 1 by means of the suction elements 13. Here also the suction elements 15 additionally located on the swivellable arms 14 ensure further fixing, although this is not shown in FIG. 3. As already mentioned a mechanical positive coupling preferably also takes place.

The gripping device 17 is necessary in order that following removal of the outer package OP the upright packaging sleeves are fed laterally, so that these can then likewise by means of the gripping device 17 be fed to the feed line of a filling machine. FIG. 3 shows longitudinal side guides 18, the dimensions of which essentially correspond to those of an outer package OP. Support on the end faces is also important. Here it is conceivable to provide an end face of the gripping device 17 with a fixed support and to dispose a further variable support 19 on the opposite side, in order to compress the packaging sleeves (not shown).

Figure 4:
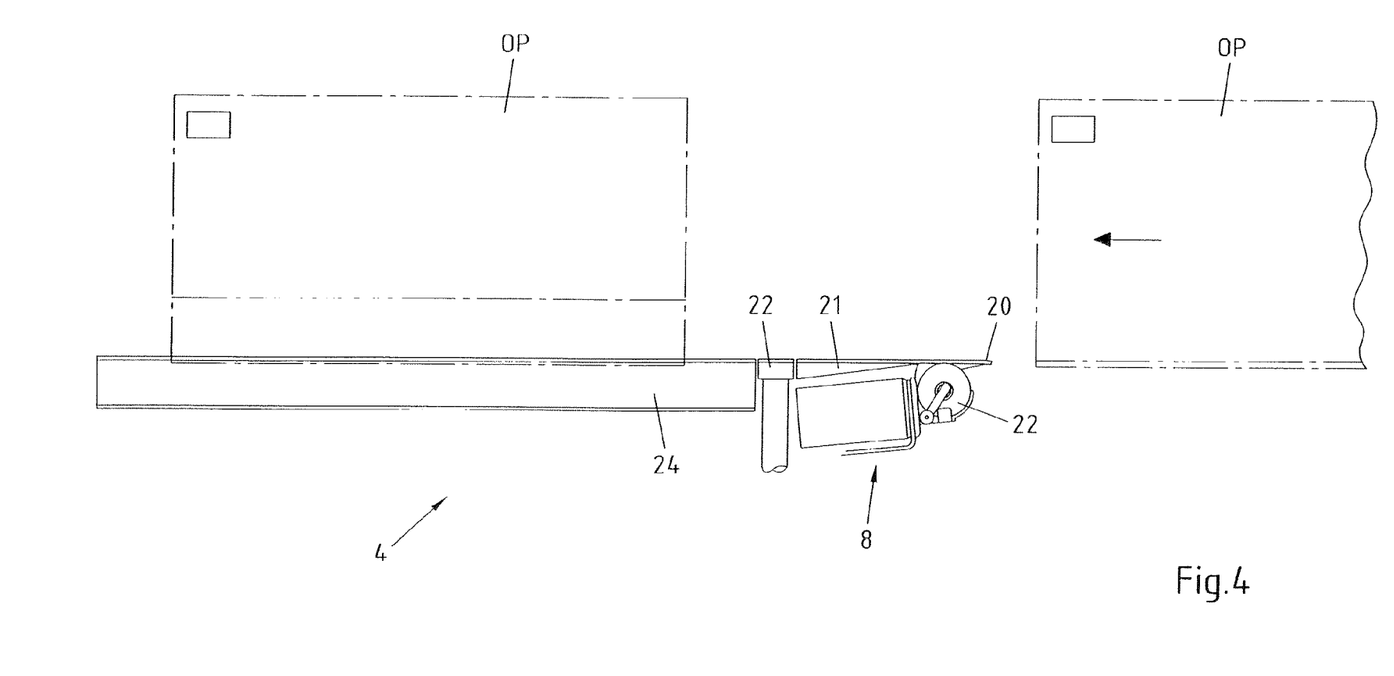
FIG. 4 the cutting and unpacking station in schematic top view.

FIG. 4 shows the cutting and unpacking station 4 with a stationary blade unit 8, against which the outer packages OP are moved from right to left in the direction of the arrow.

Figure 5A:
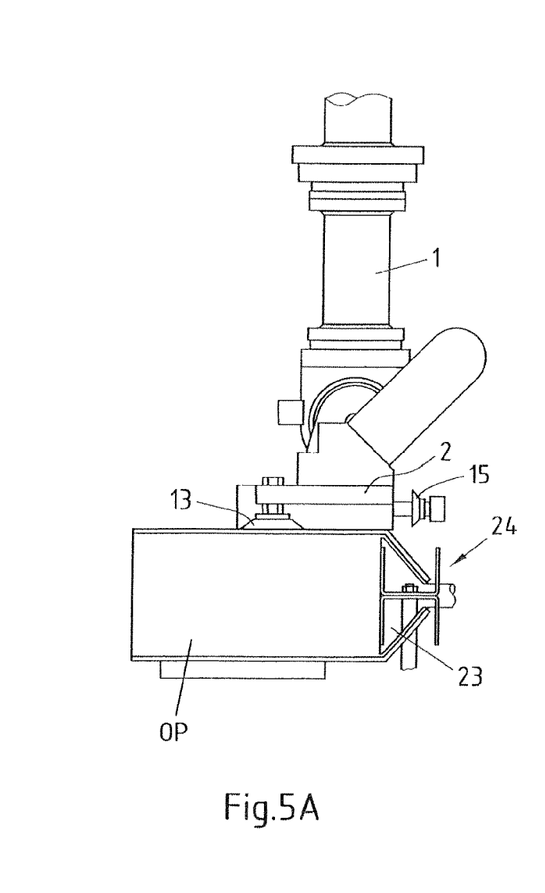
FIGS. 5A to 5F the sequence when an outer package is opened, in side view.
Figure 5B:
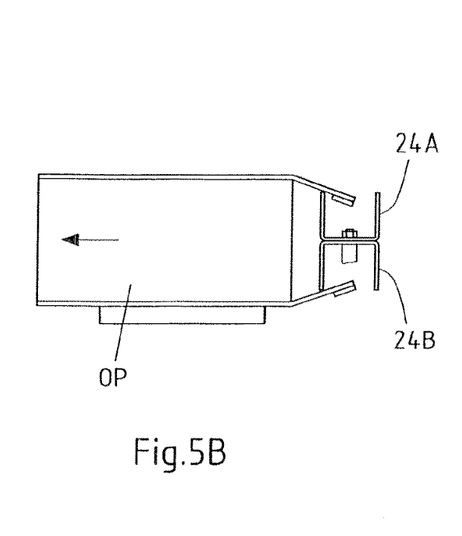
Figure 5C:
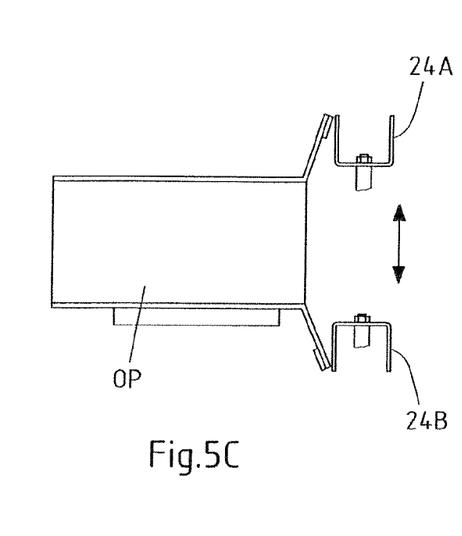
Figure 5D:
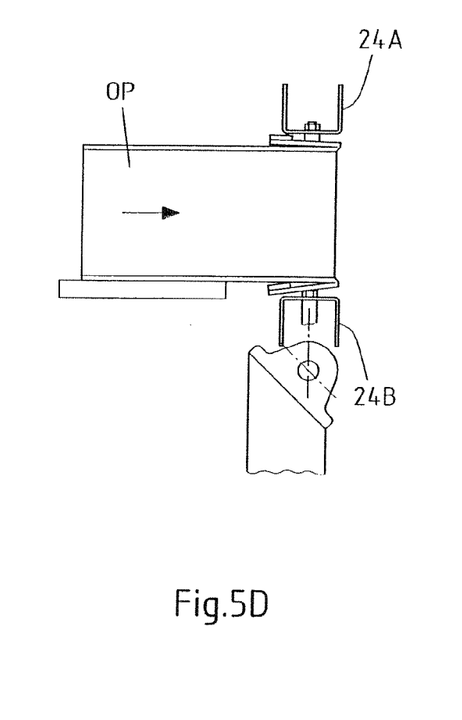
Figure 5E:
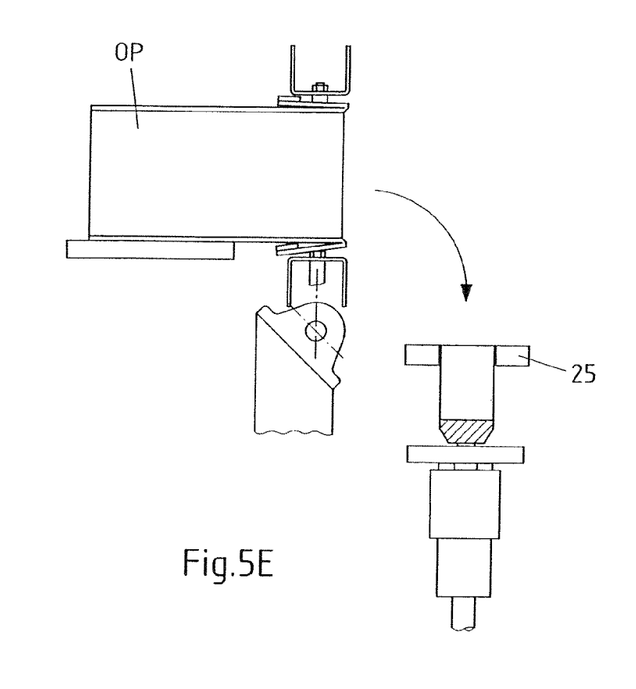

For case of understanding the opening process with its individual sequences of steps is shown in more detail in FIGS. 5A-5F. The situation of the outer package OP in FIG. 5A corresponds essentially to that shown previously in FIG. 4 in top view, but this time as a side view, in order to be able to give a better description of the opening process. By means of the robot arm 1 the gripper element 2 with the outer package OP located in it is cut open longitudinally by the blade unit 8 shown in FIG. 4 and the two open flaps are fed to an opening and turning device 24, which essentially comprises two mirror-symmetrical U-profiles disposed one above the other. In so doing the flaps, not shown in more detail here, of the outer package OP are introduced positioned at an angle of 45° into the U-profiles 24A and 24B. FIG. 4 shows how the length of the opening and turning device 24 is longer than that of the outer package OP itself. Now that the outer package OP is completely located in the opening and turning device 24, the outer package OP is displaced slightly to the left by means of the gripper element 2, so that the open flaps as a result of the U-profiles 24A and 24B open further (FIG. 5B). Then, as shown in FIG. 5C, the two U-profiles 24A and 24B are pushed apart, wherein at the same time the flaps of the outer package OP are bent up. In the next step (FIG. 5D) the outer package OP is displaced between the two U-profiles 24A and 24D (in FIG. 5D to the right), until both flaps have been swivelled back through almost 180°. In this position the gripper element now swivels the outer package OP through 90°, wherein the two U-profiles 24A and 24B brace the packaging sleeves within the now open outer package OP, on a lifting plate 25, as shown in FIG. 5E.

Figure 5F:
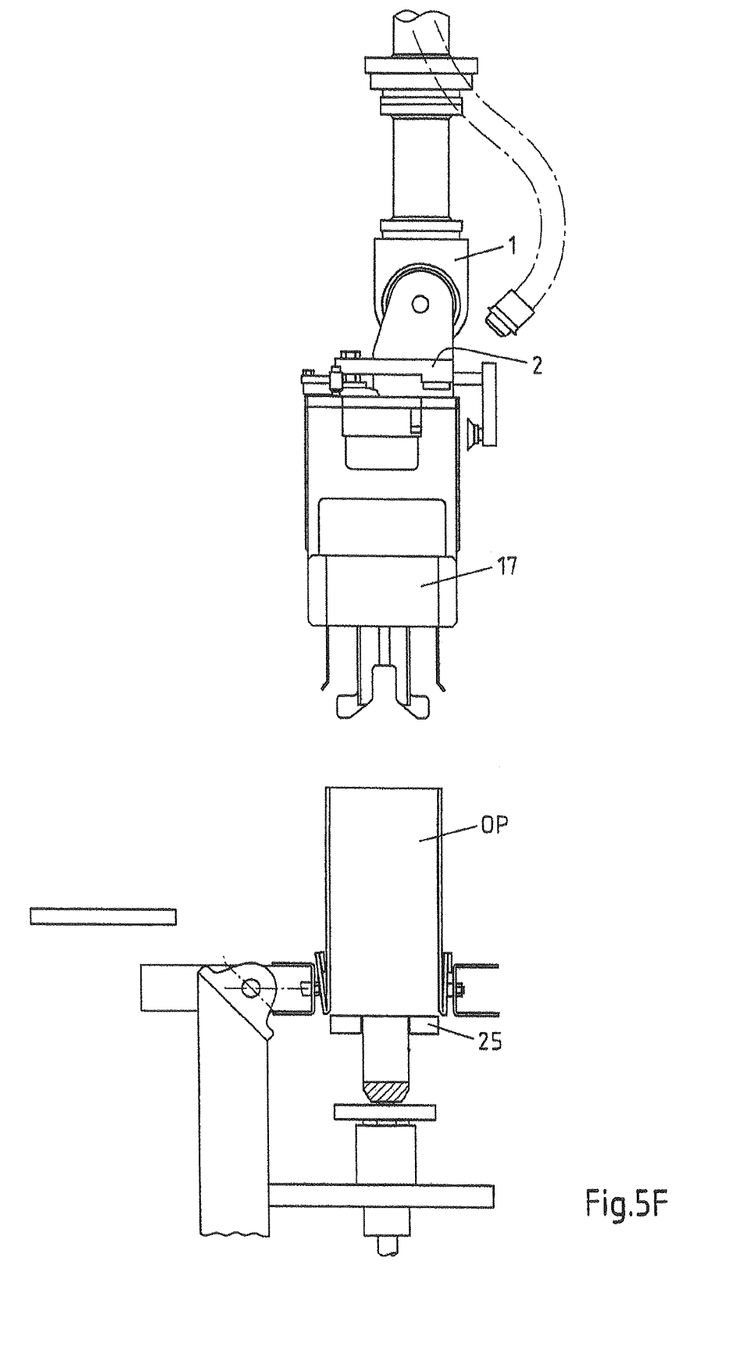

Finally, FIG. 5F shows how the outer package OP after swivelling back onto the lifting plate 25 is removed upwards, wherein the packaging sleeve that is released in the process is clamped laterally by spring supports 25. Following removal of the outer package OP the robot arm 1 with the gripping device 17 locked in place on the gripper element 2 drops onto the released packaging sleeve or—alternatively—the packaging sleeves are lifted into the gripping device 17. Not shown, is how in doing so the lifting plate is raised into the plane of the transfer device 5 to the connecting filling machine, in order to achieve a transfer in this transfer plane.

In the following the functional sequence is described in detail:

In a first step the packing pattern and position of the outer packages OP on the pallet P provided are determined. To do this the gripper arm with the laser scanner 6 passes over the top layer of the pallet P provided. A laser diode of the scanner sends a very brief, focused, laser pulse in the direction of the scanning object, that is to say the pallet P. The laser beam is reflected diffusely by the surface. A detector detects a reflected part of the laser beam, the runtime of the laser beam is determined and from this the distance to the object is calculated. By means of the strength of the reflected laser light surfaces and/or grey scales of the object colour are captured. The laser beam is deflected by a swivellable mirror, so that with the determination of the swing angle a series of measurement points in polar coordinates on the object result. The measured data comprises n pairs of values (distance, angle, reflection strength) so that a 2D image of the object results. For 3D object determination the robot arm 1 with the laser scanner 6 passes over the object and adds to the 2D pairs of values the respective positions of the travelling axis. By this method it is possible to determine the position of the outer packages OP in the highest position and by means of their colour-coding on the outer packaging the alignment of the packaging sleeves within the outer package also. In a second step the outer package OP is gripped by a gripper element 2. To do this the gripper element 2 with horizontally disposed vacuum suction elements 13 approaches the outer package OP to be picked up. As well as the lateral pickup, the vacuum suction elements travel down from above onto the outer package OP allowing it to be securely gripped in the gripper element 2.

In a third step the outer packages OP are brought into the work space of the device and opened. By crossing the lock wall 7, which in the case of the pallet provision separates the manual and automated work space of the device, the outer package OP is deposited on the cutting and unpacking station 4 in the work space of the device.

Here the upper swivel arms 14 of the gripper element 2 swing back into the starting position and allow access floor of the box by the blade unit 8. The robot arm 1 now introduces the outer package OP to the presentation tab 20 of the cutting device and with the presentation tab gently presses the front face of the outer package OP, so that this is able to easily slide below the floor of the box by withdrawing the outer package OP. Because the robot arm 1 is now moving the outer package OP in the direction of the cutter blade 22 the presentation tab 20 slides between the floor of the box and packaging sleeve thereby avoiding damage to it when the floor of the box is cut open.

As a result of the slicing of the floor of the box and the wedge shaped formation 21 of the presentation tab 20 the floor is aligned in such a way that a suction device 23 can penetrate between the floor of the box and the packaging sleeve and vacuum the packaging sleeves on their underside. This guarantees the hygienic provision of the packaging sleeve without any adherence of paper dust from the prefabrication. In the further course of the displacement by the robot arm 1 the flaps of the cut open outer packaging OP enter the opening and turning device 24, in which these are necessarily opened and thus laid against the box wall (5 g), so that when the outer package is swivelled the packaging sleeves can be deposited onto the lifting plate 25, as shown in FIGS. 5A-5F. On the head side mandrels drive against the lifting plate 25 through the outer package OP retained by the vacuum suction elements 13, 15 and separate the packaging sleeves from the outer package side wall, so that the gripping device 17 can clamp the packaging sleeves between two brackets. Then, without the risk of pulling with it the packaging sleeves adhering to the wide wall, the robot arm 1 lifts the outer package away from the clamped packaging sleeves. Then the gripper element 2 delivers the outer package to a box press 9. Here the still closed second floor of the box is cut and folded so that a subsequent pressing device can compress the box in a defined manner as described previously.

In a fourth step the gripping device 17 picks up the packaging sleeve and loads the connected filling machine. As shown in FIG. 1B, this can take place in several parallel lines.

Following transfer of the now empty outer packages OP to the box press 9 the robot arm picks up the gripping device 17 for handling the packaging sleeves. In order to reduce the cycle time, this takes place with the gripping device 17, so that a complete exchange of gripper is unnecessary. Here the gripper element 2 uses the available vacuum suction elements 13, 15 with which the gripping device 17 applies suction. Centre mounts and an electropneumatic coupling now connect sensors and actuators of the gripping device 17 with the gripper element 2.

In order to prevent the release of the gripper connection in the event of a power failure, when picking up the gripping device 17 the yoke 12 of the upper suction block enters a mechanical seat of the gripping device 17 so that the gripper connection is maintained even if the power fails.

With the gripping device 17 now picked up the gripper element 2 passes over the lifting plate 25, so that by means of a lifting movement the packaging sleeves can be transferred into the gripping device 17. Following transfer of the packaging sleeves the gripper element 2 displaces these to the transfer device 5 of the filling machine, links in with the dynamic filling process on the transfer device 5 and transfers the packaging sleeves to the filling machine (U). To complete the cycle the gripper element 2 centres the gripping device and travels to the pallet P or to the magazine 3 to pick up another outer package OP.

The magazine is loaded by the gripper element 2 in those working cycles in which loading of the filling machine is not possible due to the long cycle time of the filling machine.

The invention claimed is:

1. A device for transferring flat-folded and upright packaging sleeves to a further processing unit, one or more packaging sleeves are provided in an outer package and wherein the outer packages of the packaging sleeves are opened and removed, comprising:
at least one gripper element located on a robot arm for transporting an outer package to a cutting and unpacking station, at least one cutting element configured to cut open the outer packages, at least one device configured to unpack the packaging sleeves, at least one suction device for vacuuming away the cutting dust resulting from the cutting open, and a gripping device configured to grip the packaging sleeves released from the outer package and delivering the packaging sleeves to the further processing unit, wherein the gripping device is releasably coupled to the at least one gripper element at least partially by suction forces.

2. The device according to claim 1, wherein the gripper element comprises a plurality of pneumatically operated vacuum suction elements.

3. The device according to claim 2, wherein the gripper element further comprises three vacuum suction elements disposed in a triangle in a first plane.

4. The device according to claim 3, wherein the gripper element further comprises two arms with vacuum suction elements, wherein the two arms are swivelable in a second plane.

5. The device according to claim 1, wherein the robot arm or the gripper element has at least one optical sensor for identifying the position and alignment of the outer packages.

6. The device according to claim 5, wherein the optical sensor comprises a detector for detecting a reflected laser beam and at least one swivelable mirror for 3D object and positional determination.

7. The device according to claim 1, wherein the cutting and unpacking station has a blade unit for cutting open the outer packages.

8. The device according to claim 1, wherein the cutting and unpacking station has an opening and turning device.

9. The device according to claim 1, wherein the cutting and unpacking station has a lifting plate that is movable vertically for depositing the packaging sleeves released from the outer package.

10. The device according to claim 1, further comprising mechanism for folding flat and disposing of the removed outer packages.

11. The device according to claim 1, further comprising at least one magazine to accommodate a plurality of unopened outer packages.

12. A method for transferring flat-folded and upright packaging sleeves to a further processing unit, wherein one or more packaging sleeves are provided in an outer package and wherein the outer packages of the packaging sleeves are opened and removed, comprising the following steps:
 a) receiving an unopened outer package;
 b) aligning and transporting the outer package to a cutting and unpacking station;
 c) feeding of the top side of the outer package to a blade unit;
 d) cutting open the outer package and folding back the opened top sides;
 e) vacuuming away the resulting cutting dust;
 f) clamping and positioning of the packaging sleeves contained in the opened outer package on a lifting plate;
 g) removing the outer package and clamping of the packaging sleeve in its two free end faces;
 h) raising the lifting plate in a gripping device located above it to the level of the feed plane of the further processing unit; and
 i) delivering the packaging sleeves by means of the gripping device engaged with the packaging sleeves to the desired feed line of the further processing device;
wherein the gripping device is releasably coupled to a gripper element at least partially by suction forces.

13. The method according to claim 12, wherein the outer packages are supplied on a pallet.

14. The method according to claim 12, wherein prior to step a) the detection of the position and alignment of the unopened outer package takes place.

15. The method according to claim 12, wherein between steps a) and b) intermediate storage of unopened outer packages takes place in a magazine.

16. The method according to claim 12, wherein the outer packages are initially gripped on their free longitudinal side by the gripper element and additionally by vacuum suction elements on their top side.

17. The method according to claim 12, wherein during transfer to the cutting and unpacking station the outer packages are rotated by the gripper element in such a way that the top side of the packaging sleeve points towards the blade unit.

18. The method according to claim 12, wherein steps d) and e) are carried out simultaneously.

19. The method according to claim 12, wherein prior to step h) the top side of the packaging sleeve standing upright on the lifting plate is vacuumed.

* * * * *